United States Patent [19]
Kokotovic

[11] Patent Number: 6,076,837
[45] Date of Patent: Jun. 20, 2000

[54] METHOD AND APPARATUS FOR IMPROVING QUALITY OF ACTUATOR MOTION IN A VEHICLE ACTIVE TILT CONTROL SYSTEM

[75] Inventor: Vladimir V. Kokotovic, Bloomfield Hills, Mich.

[73] Assignee: Ford Motor Company, Dearborn, Mich.

[21] Appl. No.: 09/016,935

[22] Filed: Feb. 3, 1998

[51] Int. Cl.[7] .................................................. B60G 11/26
[52] U.S. Cl. ...................... 280/5.504; 280/5.5; 280/5.511
[58] Field of Search ............................ 280/5.502, 5.504, 280/5.506–5.508, 5.509, 5.511

[56] References Cited

U.S. PATENT DOCUMENTS

| | | | |
|---|---|---|---|
| 4,779,895 | 10/1988 | Rubel | 280/5.504 |
| 4,900,056 | 2/1990 | Fukushima et al. | 280/5.504 |
| 5,004,265 | 4/1991 | Mizutani | 280/5.504 |
| 5,013,061 | 5/1991 | Fujimura et al. | 280/5.504 |
| 5,085,460 | 2/1992 | Takahashi | 280/5.504 |
| 5,087,068 | 2/1992 | Fukanage et al. | 280/5.504 |
| 5,116,077 | 5/1992 | Karnopp et al. | 280/5.504 |
| 5,137,299 | 8/1992 | Jones | 280/5.504 |
| 5,152,547 | 10/1992 | Davis | 280/5.504 |
| 5,220,505 | 6/1993 | Yokote et al. | 364/424.05 |
| 5,294,146 | 3/1994 | Tabata et al. | 280/5.504 |
| 5,362,094 | 11/1994 | Jensen | 280/5.504 |
| 5,682,980 | 11/1997 | Reybrouck | 280/5.502 |
| 5,915,701 | 6/1999 | Heyring | 280/6.155 |

FOREIGN PATENT DOCUMENTS

| | | |
|---|---|---|
| 3720392 | 2/1988 | Germany. |
| 5178045 | 7/1993 | Japan. |

*Primary Examiner*—Eric Culbreth
*Assistant Examiner*—L. Lum
*Attorney, Agent, or Firm*—Gregory P. Brown; Roger L. May

[57] ABSTRACT

A method and apparatus is provided for improving quality of actuator motion in a vehicle active tilt control system having front and rear stabilizer bars torsionally adjusted by front and rear actuators, respectively. The actuators are movable between first and second opposing fully stroked positions via pressurized fluid which is pumped through a directional control valve to the actuators. The method includes: a) communicating only a single accumulator with the pumped, pressurized fluid prior to the actuators reaching their respective fully stroked positions in order to cushion actuator movement near the fully stroked positions; and b) automatically discommunicating the single accumulator from the pumped, pressurized fluid as the actuators move away from their respective fully stroked positions.

5 Claims, 5 Drawing Sheets

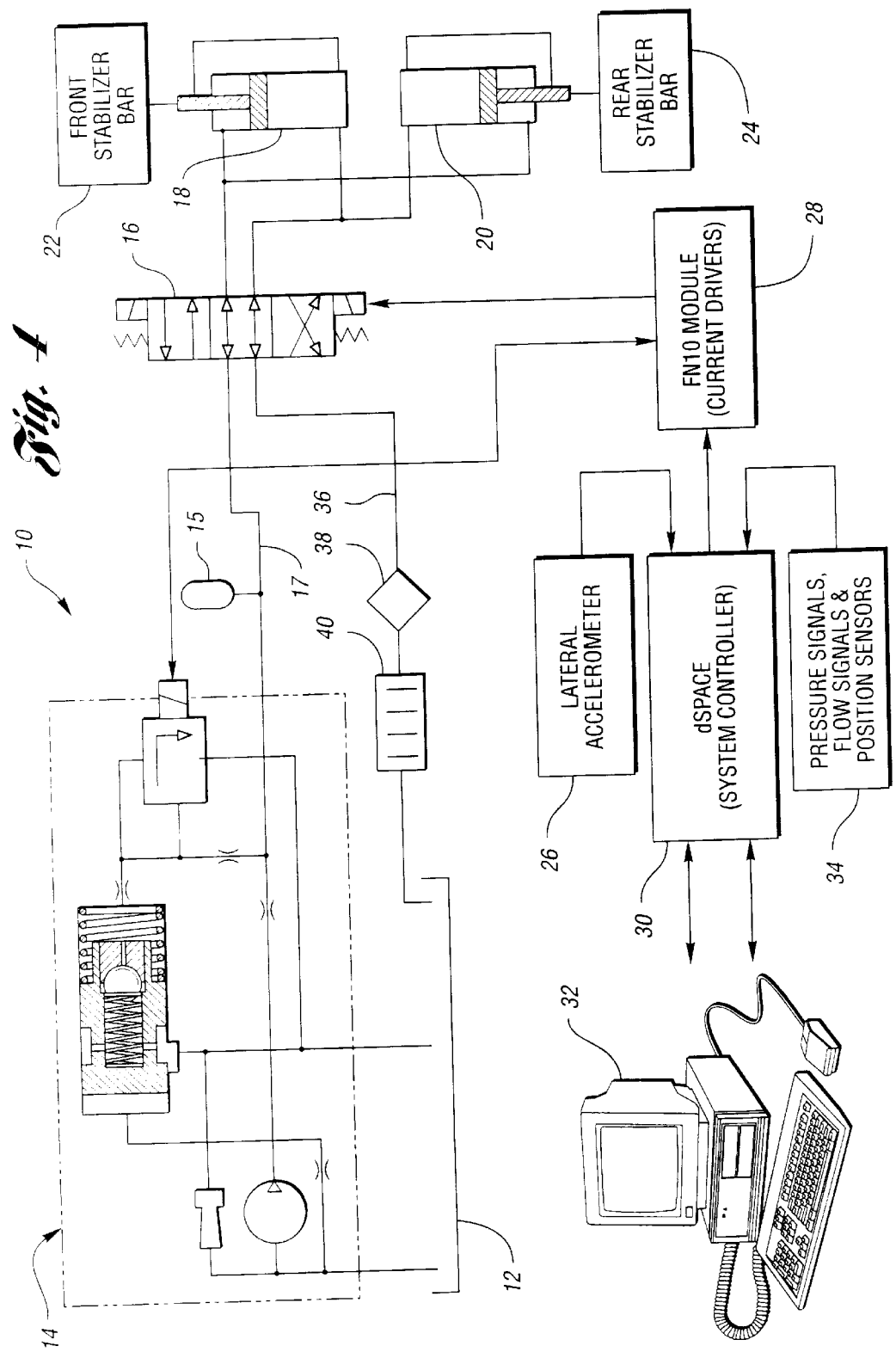

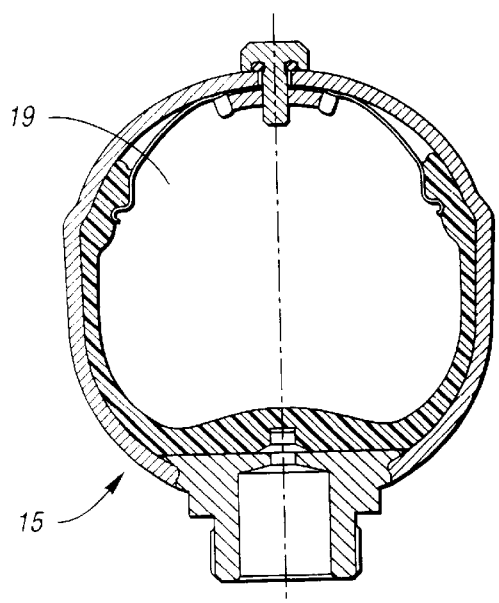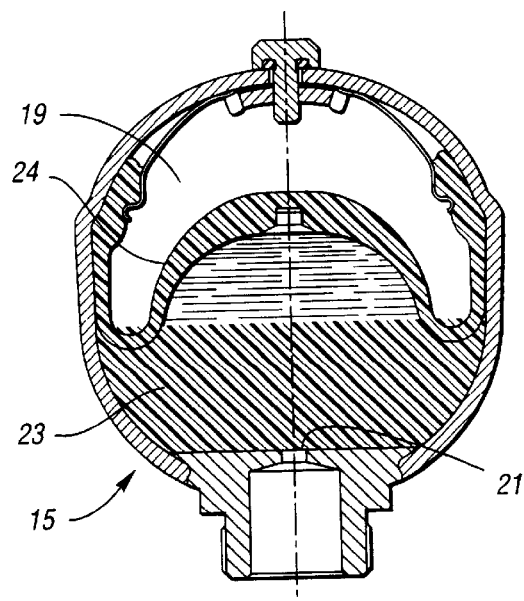
Fig. 5  Fig. 6
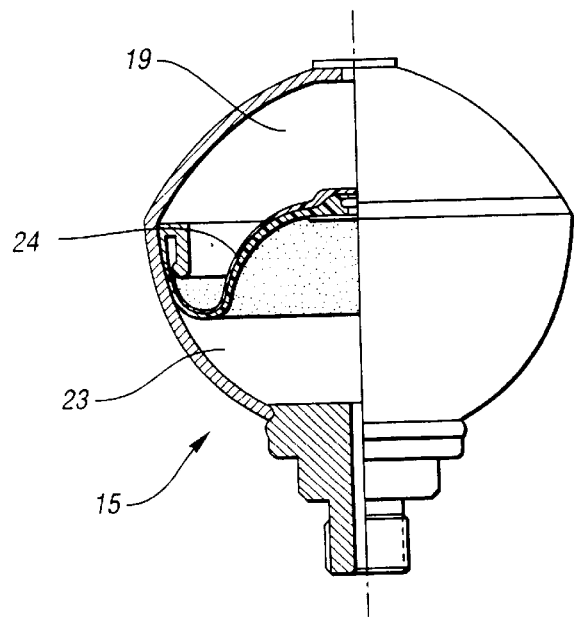
Fig. 7

METHOD AND APPARATUS FOR IMPROVING QUALITY OF ACTUATOR MOTION IN A VEHICLE ACTIVE TILT CONTROL SYSTEM

TECHNICAL FIELD

The present invention relates to a method and apparatus for improving quality of actuator motion in a vehicle tilt control system by providing a single accumulator which is communicated with the control system as the actuators approach their fully stroked positions for cushioning actuator movement.

BACKGROUND OF THE INVENTION

Automotive vehicles having independent suspensions are generally equipped with stabilizer bars to reduce inclination or roll of the vehicle bodies during vehicle maneuvers. The stabilizer bar is usually connected between the suspension arms of the vehicle wheels. When the left and right wheels are in similar positions with respect to the suspensions, the stabilizer bar does not twist so that the suspensions are mutually independent. When one of the left wheel and right wheel passes over a bump on the road surface, or when the vehicle turns and thus the left wheel and the right wheel assume considerably different positions with respect to the suspensions, the stabilizer bar is twisted. This twisting motion induces a torsional resilient force for affecting the handling and ride performance characteristics of the vehicle wheels.

It is desirable that the torsional resilient force of the stabilizer bars can be adjusted in accordance with ride and handling conditions of the vehicle. Specifically, it is desirable to reduce the torsional rigidity during straight travel of the vehicle and to increase the torsional rigidity during turning of the vehicle. The reduced torsional rigidity enhances the ride and handling characteristics of the vehicle wheels while the increased torsional rigidity enhances the handling and ride characteristics of the vehicle.

Certain vehicle active tilt control systems include front and rear stabilizer bars which are adjustable by front and rear hydraulic actuators placed in lieu of the stabilizer bar linkages. The actuators are movable in first and second opposing directions for adjusting vehicle body active roll moment to compensate for vehicle roll.

Some prior art vehicle active control systems include numerous accumulators in the system which act as gas springs for accumulating energy in order to respond to system demand and fill-in flow when needed. Such systems are typically very expensive because they employ numerous valves and some include two accumulators per corner, which increases cost.

The quality of motion of the actuators is very important for a comfortable ride. The evaluation of the motion quality is based on actuator motion quality criteria. Mainly, for any motion control system and for an active tilt control system as well, there are apparent advantages to having smooth actuator motion. The smooth motion is motion without discontinuities in actuator trajectories. "Monotonic" motion is defined as a change in the velocity vector angle only in one direction during a single stroke.

For example, when the velocity vector angle only decreases during the actuator motion, the motion can be considered high quality motion. Motion where the velocity vector angle is decreasing and increasing during a single directional movement is considered low quality. These two situations are illustrated in FIGS. 1 and 2. As shown in FIG. 1, the actuator continues to move toward the end stop without reversing velocity vector gradient, while in FIG. 2, the actuator actually changes direction of velocity vector gradient, or jerks, when moving toward an end stop.

In most motion control systems where linear or rotary actuators are implemented, it is very desirable to have decreasing velocity toward the end stop of the actuators. Velocity close to zero at the end stop would be the ideal case.

An active tilt control system is not exempted from these rules. If the actuator's velocity is not decreased toward the end stop, it is likely that the transient roll angle will overshoot. Even if the overshoot is not present, roll motion will not be comfortable for the passengers. In addition to the ride quality, there are other reasons for the decrease of the actuator speed at the end of travel. One reason is that the violent change of acceleration when the actuator slams into the end stop. The acceleration in this case is a scaled version of the supply pressure. If the pressure transient within the actuator's chamber is not smooth, and has break points or discontinuities or high frequency oscillations, the actuator components will suffer damage, which results in reduced life expectancy for such components. In other words, large acceleration changes result in large forces which may damage components and result in an uncomfortable ride for vehicle occupants.

Discontinuities in actuator motion are considered break points that represent sudden change in the actuator velocity angle. This change in the active tilt control system case means that actuators actually speed up at the end stop. The front and rear actuator strokes illustrated in FIGS. 3a and 3b are not synchronized, which means when one actuator bottoms out, fluid enters the chamber of the moving actuator, which accelerates the actuator toward the bottom out position. This is a highly undesirable situation.

Different automotive suppliers have proposed using numerous hydraulic accumulators to achieve functional and comfortable ride quality. Similarly, the use of spool valves has been introduced to distribute the flow between the actuators to smooth out the ride. However, such configurations are highly expensive.

It is therefore desirable to provide an improved vehicle active tilt control system in which actuator movement is cushioned near the end stops for improving quality of the system and reducing component wear without a substantial cost penalty.

DISCLOSURE OF THE INVENTION

The present invention overcomes the above-referenced shortcomings of prior art vehicle active tilt control systems by providing a method and apparatus for improving quality of actuator motion in a vehicle active tilt control system in which only a single accumulator is selectively communicated with the pumped, pressurized fluid automatically when fluid pressure exceeds the precharged pressure of the accumulator as the actuators near their end stop for cushioning actuator movement.

More specifically, the present invention provides a method of improving quality of actuator motion in a vehicle active tilt control system having front and rear stabilizer bars torsionally adjusted by front and rear actuators, respectively. The actuators are movable between first and second opposing fully stroked positions via pressurized fluid which is pumped through a directional control valve to the actuators. The method comprises: a) communicating only a single accumulator with the pumped, pressurized fluid prior to the actuators reaching their respective fully stroked positions in order to cushion actuator motion near the fully stroked positions; and b) automatically discommunicating the single accumulator from the pumped, pressurized fluid as the actuators move away from their respective fully stroked positions. This automatic discommunication occurs when the precharged gas pressure of the accumulator exceeds the fluid pressure.

The present invention also provides an apparatus for improving quality of actuator motion in a vehicle active tilt control system having front and rear stabilizer bars torsionally adjusted by front and rear actuators. The apparatus comprises a pressure-controlled pump which pumps hydraulic fluid through a directional control valve to the front and rear actuators. A single accumulator is communicated between the directional control valve and the pump for cushioning actuator movement as the actuators approach their respective fully stroked positions.

Accordingly, an object of the present invention is to provide a method and apparatus for improving quality of motion in a vehicle active tilt control system by selectively communicating a single accumulator with the pressurized fluid in the system as the actuators approach their fully stroked positions for cushioning actuator motion.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 shows a schematic of a vehicle active tilt control system in accordance with the present invention;

FIG. 5 shows a vertical cross-sectional view of an accumulator for use with the present invention;

FIG. 6 shows a vertical cross-sectional view of the accumulator of FIG. 5 with the accumulator in the open position;

FIG. 7 shows a cut-away front view of the accumulator of FIG. 5;

DETAILED DESCRIPTION OF THE PREFERRED EMBODIMENT

Figure 1:
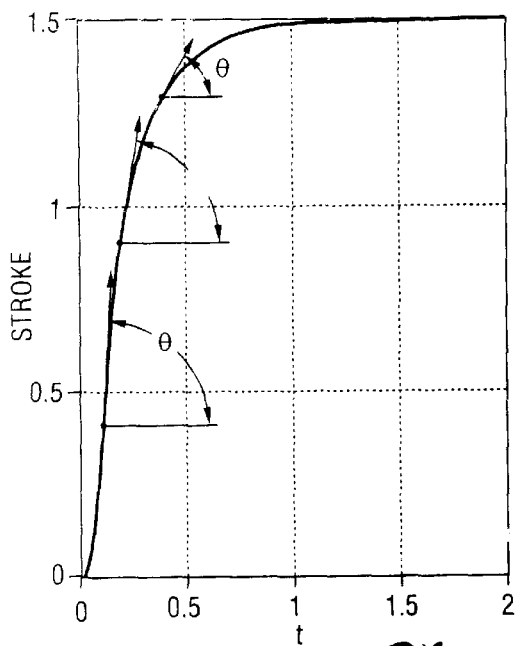
FIG. 1 shows a stroke vs. time graph for an ideal, monotonic motion system.
Figure 2:
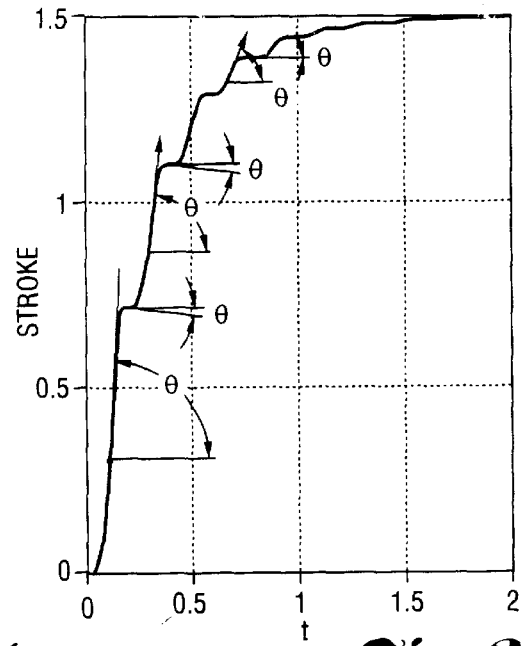
FIG. 2 shows a stroke vs. time graph for a system having unacceptable motion quality.
Figure 3A:
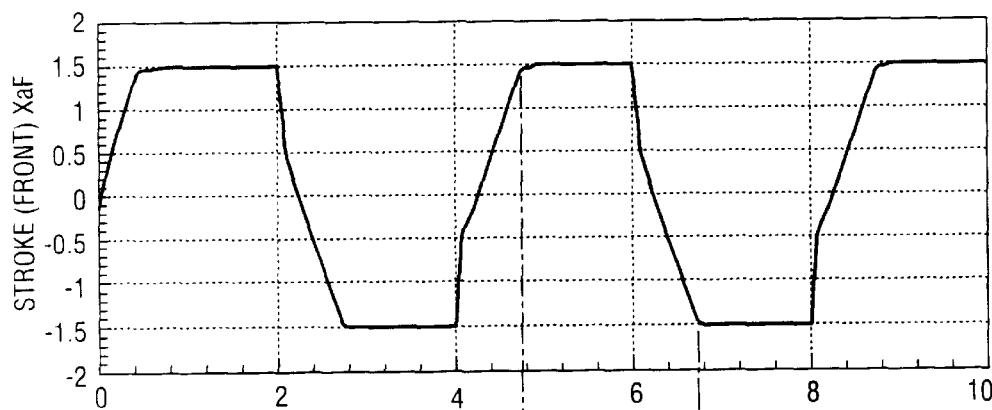
FIGS. 3a and 3b illustrate stroke vs. time for a front and rear actuator in accordance with the prior art, wherein the front and rear actuators are not synchronized.
Figure 3B:
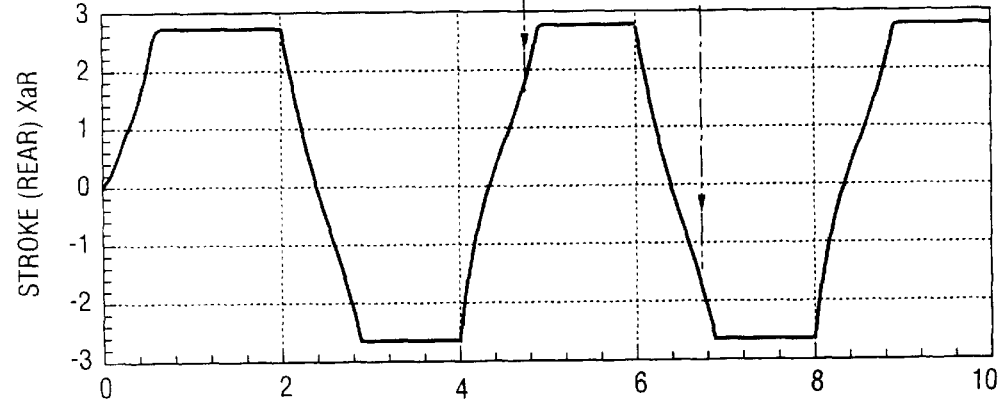

Referring to FIG. 4, a vehicle active tilt control system 10 is shown in accordance with the present invention. As shown, a hydraulic tank 12 provides hydraulic fluid which is pumped by the pump 14 to the directional control valve 16. An accumulator 15 is selectively connected on the main line 17 between the pump 14 and the directional valve 16 for use as described below.

The directional control valve 16 selectively directs the pressurized fluid to opposing chambers in the front and rear actuators 18,20 for establishing the direction of movement of the actuators 18,20. The front and rear actuators 18,20 are connected, respectively, to the front and rear stabilizer bars 22,24 in lieu of the stabilizer bars' linkages. Preferably, the front and rear actuators 18,20 are single rod end double-acting actuators. The actuators 18,20 wind-up the stabilizer bars 22,24, thus creating the desired force needed to resist body roll during vehicle maneuvers.

The vehicle active tilt control system 10 includes only a single lateral accelerometer 26 which measures the direction and magnitude of lateral acceleration during vehicle maneuvers. For purposes of testing the strategy, a particular vehicle control module 28, system controller 30, and laptop computer 32 were provided as shown in FIG. 4 for receiving the pressure, flow and position signals 34, as well as lateral accelerometer 26 signals for controlling the directional control valve 16 and the pressure control valve in the pump 14. Of course, in operation, the present invention will use an existing vehicle computer rather than the laptop computer 32 for control.

FIG. 4 also shows a fluid return circuit 36, which includes a filter 38 and cooler 40 for returning the hydraulic fluid to the tank 12 from the actuators 18,20.

Based on lateral acceleration from the lateral accelerometer 26 and vehicle speed signals, the pump 14 and the directional valve 16 are controlled. Together, these components determine the pressure (force) and direction (extend or compress) of the actuators 18,20 for winding up the stabilizer bars 22,24.

The system may include high frequency oscillations because of the stiffness of the pump internal circuit. Also, the fast response time of the pump may result in overshoot as the actuators are hitting the end stops which causes low frequency oscillation, and may damage or reduce life expectancy of system components. To make the active tilt control system more compliant, and to avoid problems associated with high and low frequency oscillations during the transient between less and more compliance, the present invention provides an active tilt control system with a single, small automotive accumulator 15 on the main line 17. The accumulator 15 is precharged to a pressure that is approximately 2% to 5% smaller than the pressure needed to completely stroke both actuators.

As shown in FIGS. 5–7, the accumulator 15 is precharged with a nitrogen gas 19, and oil 23 enters the accumulator 15 at the system pressure through the valve 21. The accumulator 15 is normally open and cushions actuator motion when fluid pressure overcomes the precharge pressure of the accumulator, which occurs as the actuators approach their end stops. This is non-standard use of an accumulator. It is used only for cushioning actuator motion, which is adjustable by adjusting precharge pressure of the accumulator. The accumulator is used here to provide a compliant system and not to simply provide additional flow as demanded when the pump cannot, as accumulators are traditionally used.

The oil 23 and gas 19 are separated by the diaphragm 24. The diaphragm 24 is preferably coated with a PVL film.

Figure 8A:
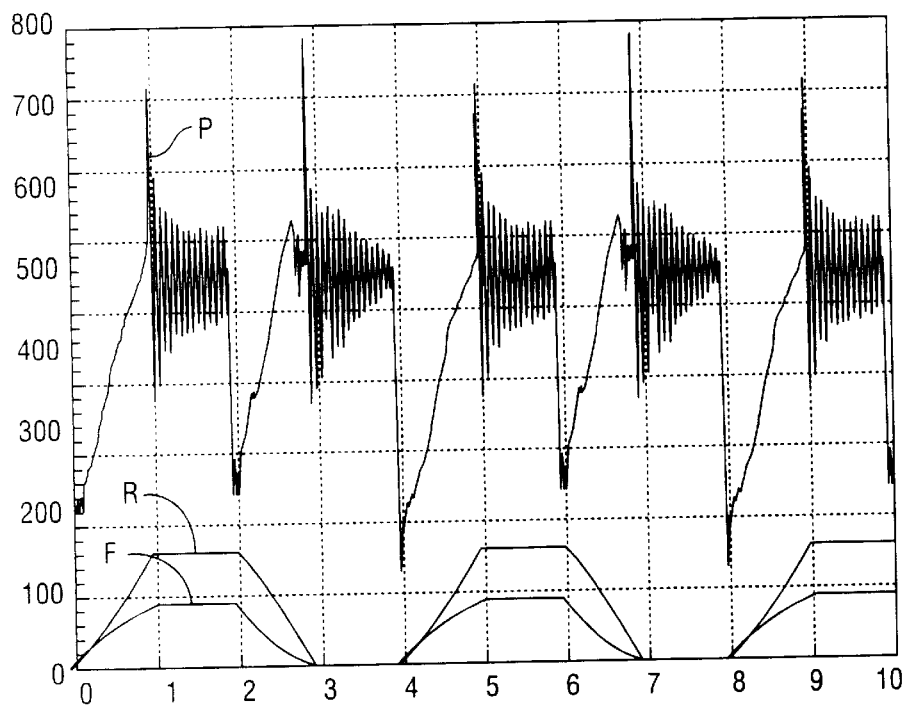
FIGS. 8a and 8b are graphical illustrations of pressure and actuator positions vs. time, respectively, for systems not using the accumulator of the present invention.
Figure 8B:
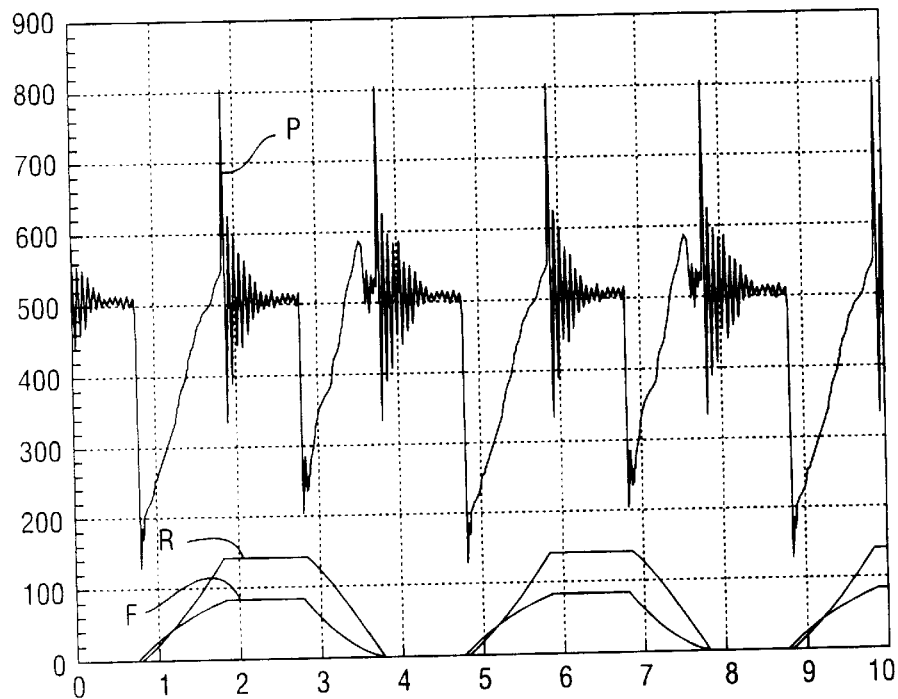

FIGS. 8a and 8b illustrate pressure and actuator position vs. time for systems not including the accumulator of the present invention. As shown, the pressure may oscillate violently when the front and rear actuators (F,R) slam against the end stops.

The pump 14 may have a problem maintaining stable operation during sudden changes of system compliance. The first cause of pressure oscillation is related to the sudden change in system compliance when the actuators are reaching the end of travel. The generated pressure wave in this case excites the main stage pressure relief spool in the pump 14, which has high flow gain. This particular oscillation is more pronounced when higher pulley ratio is used to drive the pump.

High frequency oscillation can also appear within the spring chamber of the main pressure relief spool of the pump 14. This oscillation is excited by the sudden change in the system compliance when the actuators are against the end stop. When the control volume between the pilot and main stage spring chambers are non-compliant, the problem is accentuated. The disturbance dynamics of the pilot valve stage and control spring chamber volume may oscillate with 15–16 Hz frequency as represented in FIGS. 8a and 8b.

Figure 9:
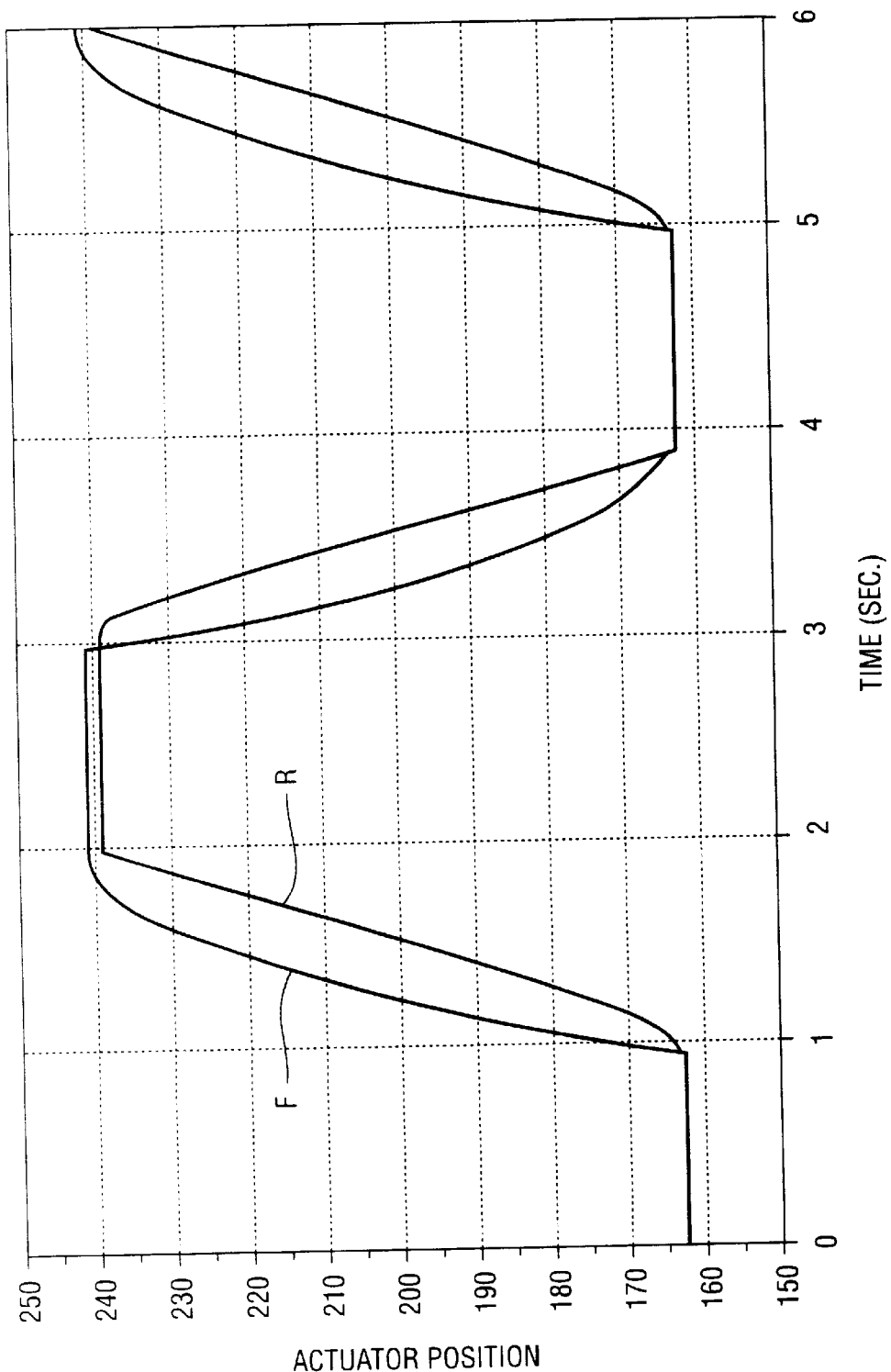
FIG. 9 illustrates an actuator position vs. time graph for front and rear actuators in accordance with the present invention.

Referring to FIG. 9, this particular oscillation disappears with the accumulator present on the main line in accordance with the present invention. As shown in FIG. 9 in the actuator position vs. time graph for a vehicle active tilt control system employing an accumulator 15 as shown in FIG. 4, the front and rear actuators, F,R, decelerate as they approach their end stop, which prevents the actuators from slamming against the end stop and causing pressure oscillations in the system.

The accumulator 15 in the main line 17 provides pressure response that is much smoother without high frequency content than that present in the systems without accumulators. The pressure wave generated by the sudden change of system compliance is filtered out by the accumulator 15 and the system is stable for all frequencies.

Both causes of oscillation are cured with the presence of the single accumulator 15 on the main supply line. The active tilt control system is made much more stable, robust, and quiet, which provides high quality motion, a comfortable ride, long component life, etc.

Preferably, the accumulator 15 is communicated with the pumped, pressurized fluid in the main line 17 just prior to the actuators reaching their respective fully stroked positions in order to cushion actuator movement near the fully stroked positions. This communication occurs automatically when fluid pressure exceeds a predetermined fluid pressure level. This predetermined fluid pressure level is the precharge pressure of the accumulator. When the fluid pressure exceeds the precharge pressure, the fluid causes the accumulator diaphragm 24 to begin moving, which provides compliance in the system, thereby cushioning actuator motion. The accumulator 15 is then discommunicated from the pumped, pressurized fluid as the actuators move away from their respective fully stroked positions. This discommunication occurs as the fluid pressure decreases past the predetermined fluid pressure.

In order to achieve fast response in the initial stages of actuator motion, the accumulator 15 is discommunicated from the system. When the actuators are compressing the stabilizer bars and are approaching the ends stops, the accumulator 15 is open, and more compliance is present in the system. As a result, actuator motion is of high quality without discontinuities and with close to zero velocity at the end stop. In addition, there are no high frequency content pressure ripples.

The structure-borne noise within the active tilt control system is caused by the pressure oscillations. Pressure oscillations can be high frequency or low frequency oscillations. Both types of oscillations cause pump elements to exhibit much larger displacement than in normal operation. Displacements are amplified during resonant frequency oscillations while components are slammed against each other. The audible noise is generated and amplified by the pump housing. With the present invention, the pressure can be stabilized and pressure oscillations attenuated with the accumulator present in the line.

Another advantage of the accumulator on the main line is that the active tilt control system is more tunable. Systems can be tuned to be stable and to achieve smooth and comfortable ride, as well as to provide synchronized actuator motion, i.e. to affect the understeer characteristic. The size of the accumulator and the precharge pressure are parameters available for such tuning.

A further advantage of the accumulator of the present invention is improved reliability. High frequency pressure ripple content present within the system without accumulators may damage elements of the system's components, which reduces component life and adversely effects system reliability. The reduction of high frequency pressure ripples accordingly improves reliability of the system.

While the best mode for carrying out the invention has been described in detail, those familiar with the art to which this invention relates will recognize various alternative designs and embodiments for practicing the invention within the scope of the appended claims.

What is claimed is:

1. A method of improving quality of actuator motion in a vehicle active tilt control system having front and rear stabilizer bars torsionally adjusted by front and rear actuators, respectively, wherein the actuators are movable between first and second opposing fully stroked positions via pressurized fluid which is pumped through a directional control valve to the actuators, the method comprising:

precharging a single accumulator to a predetermined pressure level less than a pressure needed to move the actuators between the first and second fully stroked positions;

providing said single accumulator in a normally open condition in fluid communication with the pumped, pressurized fluid between the directional control valve and the actuators; and decelerating the actuators near the fully stroked positions by communicating said single accumulator with the pumped, pressurized fluid when fluid pressure of the pressurized fluid overcomes the precharged predetermined pressure level in the accumulator prior to the actuators reaching their respective fully stroked positions in order to cushion actuator movement near the fully stroked positions.

2. The method of claim 1, wherein said communicating step occurs when fluid pressure exceeds a predetermined fluid pressure and said single accumulator is automatically discommunicated from the fluid as the fluid pressure decreases past said predetermined fluid pressure.

3. A vehicle active tilt control system with improved quality of adjustment of front and rear stabilizer bars during vehicle maneuvers, the system comprising:

front and rear actuators connected, respectively, to the front and rear stabilizer bars for selectively twisting the stabilizer bars, wherein the actuators are movable between first and second opposing fully stroked positions for twisting the stabilizers bars in opposing directions;

a directional control valve operatively connected to said front and rear actuators for directing fluid flow to the actuators to selectively cause movement of the actuators toward their respective first and second fully stroked positions;

a pump operatively connected to the directional control valve for delivering pressurized fluid to the directional control valve; and a single accumulator connected between said pump and said directional control valve, wherein said single accumulator is in continuous fluid communication with the pressurized fluid as said actuators approach their respective fully stroked positions for automatically cushioning actuator movement near the respective fully stroked positions.

4. A method of improving quality of actuator motion in a vehicle active tilt control system having front and rear stabilizer bars torsionally adjusted by front and rear actuators, respectively, wherein the actuators are movable between first and second opposing fully stroked positions via pressurized fluid which is pumped through a directional control valve to the actuators, the method comprising:

providing only a single accumulator precharged to a predetermined fluid pressure in selective fluid communication with the pumped, pressurized fluid between the directional control valve and the actuators;

filtering high frequency pressure oscillations in the fluid by communicating said single accumulator with the pumped, pressurized fluid when fluid pressure exceeds the predetermined fluid pressure prior to the actuators reaching their respective fully stroked positions in order to cushion actuator movement near the fully stroked positions; and automatically discommunicating said single accumulator from the pumped, pressurized fluid as the fluid pressure decreases past said predetermined fluid pressure as the actuators move away from their respective fully stroked positions.

5. The method of claim 4, wherein said predetermined fluid pressure is a pressure level slightly less than a level sufficient to fully stroke both actuators.

* * * * *